(12) United States Patent
Endo et al.

(10) Patent No.: US 11,387,496 B2
(45) Date of Patent: Jul. 12, 2022

(54) METHOD OF MAKING ALKALINE BATTERY WITH GAP BETWEEN PELLETS

(71) Applicant: FDK CORPORATION, Tokyo (JP)

(72) Inventors: Takahiro Endo, Kosai (JP); Yuki Natsume, Kosai (JP); Takeo Nogami, Kosai (JP); Hidenori Tsuzuki, Kosai (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 17/111,750

(22) Filed: Dec. 4, 2020

(65) Prior Publication Data

US 2021/0091415 A1 Mar. 25, 2021

Related U.S. Application Data

(63) Continuation of application No. 15/545,219, filed as application No. PCT/JP2015/051918 on Jan. 23, 2015, now abandoned.

(51) Int. Cl.
*H01M 4/06* (2006.01)
*H01M 4/24* (2006.01)
(Continued)

(52) U.S. Cl.
CPC ........... *H01M 10/283* (2013.01); *H01M 4/06* (2013.01); *H01M 4/24* (2013.01); *H01M 4/244* (2013.01);
(Continued)

(58) Field of Classification Search
CPC ........ H01M 10/283; H01M 4/06; H01M 4/24; H01M 4/244; H01M 4/42; H01M 4/50;
(Continued)

(56) References Cited

U.S. PATENT DOCUMENTS

2005/0227145 A1 10/2005 Iwamoto et al.
2008/0063938 A1 3/2008 Nunome et al.
(Continued)

FOREIGN PATENT DOCUMENTS

CN 101114707 A 1/2008
JP 63024559 A 2/1988
(Continued)

OTHER PUBLICATIONS

Machine translation of JP 4765195B2, Yamamoto et al., 2011 (Year: 2011).*

(Continued)

*Primary Examiner* — Kwang Han
(74) *Attorney, Agent, or Firm* — Greer Burns & Crain Ltd.

(57) ABSTRACT

An alkaline battery is made by press-fitting a plurality of tubular positive electrode pellets inside of an open end of a cylindrical positive electrode can. The press-fitting is performed in such a manner as to stack the positive electrode pellets coaxially inside of and in contact with the positive electrode can, with gaps between adjacent positive electrode pellets. A separator is disposed inside of the tubular pellets, and a negative electrode mixture is placed inside of the separator. A negative electrode current collector is inserted into the negative electrode mixture, and the opening at the open end of the positive electrode can is sealed with a negative electrode terminal plate.

4 Claims, 1 Drawing Sheet

(51) Int. Cl.
  *H01M 4/42* (2006.01)
  *H01M 4/50* (2010.01)
  *H01M 6/02* (2006.01)
  *H01M 6/08* (2006.01)
  *H01M 10/28* (2006.01)
  *H01M 6/18* (2006.01)

(52) U.S. Cl.
  CPC .............. *H01M 4/42* (2013.01); *H01M 4/50* (2013.01); *H01M 4/502* (2013.01); *H01M 6/02* (2013.01); *H01M 6/08* (2013.01); *H01M 6/185* (2013.01); *H01M 2220/30* (2013.01)

(58) Field of Classification Search
  CPC .......... H01M 4/502; H01M 6/02; H01M 6/08; H01M 6/185; H01M 2220/30; Y02E 60/10; Y02P 70/50
  See application file for complete search history.

(56) References Cited

U.S. PATENT DOCUMENTS

| | | | |
|---|---|---|---|
| 2009/0269660 A1 | 10/2009 | Shimamura et al. | |
| 2011/0206983 A1* | 8/2011 | Hano | H01M 50/182 429/166 |
| 2012/0094159 A1 | 4/2012 | Okada et al. | |

FOREIGN PATENT DOCUMENTS

| | | | | |
|---|---|---|---|---|
| JP | 02100264 | A | 4/1990 | |
| JP | 2000106176 | A | 4/2000 | |
| JP | 2001155720 | A | 6/2001 | |
| JP | 2005322613 | A | 11/2005 | |
| JP | 2008041490 | A | 2/2008 | |
| JP | 2008066100 | A | 3/2008 | |
| JP | 2009266661 | A | 11/2009 | |
| JP | 2010218946 | A | 9/2010 | |
| JP | 2011028895 | A | 2/2011 | |
| JP | 4765195 | B2 * | 9/2011 | ............. Y02E 60/10 |
| JP | 5172181 | B2 | 3/2013 | |
| WO | 2011001603 | A1 | 1/2011 | |
| WO | 2012049720 | A1 | 4/2012 | |

OTHER PUBLICATIONS

Int'l. Search Report issued in Int'l App. No. PCT/JP2015/051918, dated Mar. 24, 2015.
Japanese office action issued in corresponding Japanese Patent App No. 2014-009705, dated Aug. 25, 2017 (with translation).
Extended EP Search Report issued in EP App. No. 15 87 8819.0, dated May 23, 2018.
Chinese office action issued in corresponding Chinese patent application No. 2015800737171, dated Nov. 30, 2018 (with translation).
Chinese Office action issued in corresponding Chinese patent application No. 201580073717.1, dated Jun. 25, 2019.
EP office action issued in corresponding European patent application No. 15 878 819.0, dated Mar. 18, 2019.
EP Official Communication issued in corresponding EP application No. 15 878 819.0, dated Nov. 13, 2019.
Chinese Reexamination Notification issued in CN application No. 201580073717.1, dated Mar. 24, 2020 (with translation).
Appeal decision issued in corresponding Chinese patent application No. 201580073717.1, dated Feb. 1, 2021 (with translation).

* cited by examiner

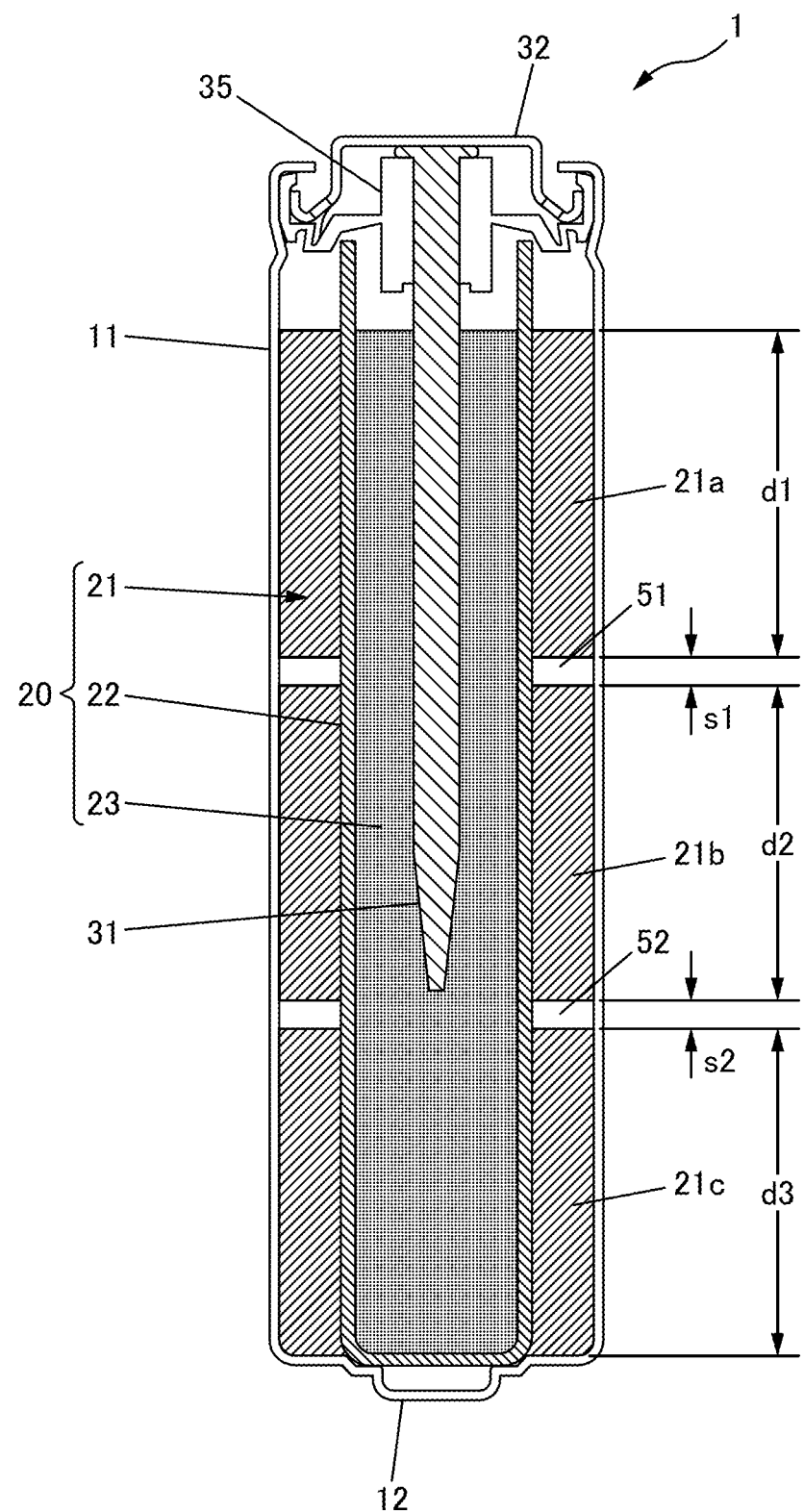

US 11,387,496 B2

METHOD OF MAKING ALKALINE BATTERY WITH GAP BETWEEN PELLETS

This is a Continuation of application Ser. No. 15/545,219 filed Jul. 20, 2017, which is a National Phase Application filed under 35 U.S.C. § 371, of International Application No. PCT/JP2015/051918, filed Jan. 23, 2015, the contents of which are incorporated by reference.

TECHNICAL FIELD

The present disclosure relates to discharge performance of an alkaline battery and especially relates to improvement in heavy load discharge performance.

BACKGROUND ART

Recently, electronic devices such as digital cameras, video cameras, mobile phones, and smart phones have been improved their performance and downsizing, and requests for improvement in performance of alkaline batteries, which are used as power supplies for such electronic devices, have been increased. Especially, requests for improvement in heavy load discharge performance (high load discharge characteristics) have been increased.

For example, Patent Literature 1 describes a technique to improve the high load discharge characteristics of an alkaline battery as follows. The alkaline battery includes a negative electrode that contains a zinc alloy powder containing fine powders having a grain diameter of 75 μm or less at 20 to 50 weight %, a positive electrode, a separator arranged between the negative electrode and the positive electrode, and an electrolyte. The alkaline battery is configured such that a time period for an electric potential of the negative electrode to rise becomes shorter than a time period for an electric potential of the positive electrode to fall, in constant resistance discharge.

CITATION LIST

Patent Literature

Patent Literature 1: Japanese Patent No. 5172181

SUMMARY OF INVENTION

Technical Problem

In the above-described Patent Literature 1, the zinc alloy powder containing fine powders having a grain diameter of 75 μm or less at 20 to 50 weight % is used as a negative electrode material to improve heavy load discharge characteristics. However, even when the fine powders are used for the negative electrode material, the heavy load discharge characteristics may not be improved. A reason why this occurs is considered as follow. Such a fine powder of a small grain diameter has a large specific surface, and thus the electrolyte is likely to be held on the negative electrode side. This reduces the electrolyte on the positive electrode side and increases electrical resistance on the positive electrode side.

An aspect of the present disclosure is to improve discharge performance of an alkaline battery, and especially to provide the alkaline battery excellent in heavy load discharge performance.

Solution to Problem

One of the present disclosure to achieve such an aspect is an alkaline battery comprising: a positive electrode mixture filling a tubular positive electrode can closed at one end; a separator disposed on an inner peripheral side of the positive electrode mixture; a negative electrode mixture filling an inner peripheral side of the separator, the negative electrode mixture containing a powder mainly containing zinc; a negative electrode current collector inserted into the negative electrode mixture; a negative electrode terminal plate to seal an opening of the positive electrode can; and an alkaline electrolyte, the positive electrode mixture containing manganese dioxide and a conductive material, the powder containing particles with a granularity of 75 μm or less in a range of 25 to 40 mass %, the positive electrode mixture constituted of a plurality of tubular pellets, the plurality of tubular pellets loaded inside the positive electrode can in such a manner as to be stacked coaxially with the positive electrode can, one or more gaps disposed between the pellets, the gaps and the pellets having a ratio of a sum s of length of the gaps axially along the positive electrode can to a sum d of lengths of the pellets axially along the positive electrode can, the ratio being 1 to 14%.

Another one of the present disclosure according to the above-described alkaline battery is configured as follows. The pellets have a density in a range of 3.0 to 3.7 $g/cm^3$.

Another one of the present disclosure according to the above-described alkaline battery is configured as follows. The pellets contain graphite as the conductive material in a range of 5 to 20 mass % with respect to the manganese dioxide.

Aspects disclosed in the present application and solution thereof will be apparent from Description of Embodiments and the drawings.

Advantageous Effects

The present disclosure can provide an alkaline battery excellent in discharge performance, especially, heavy load discharge performance.

BRIEF DESCRIPTION OF THE DRAWINGS

FIG. 1 is a diagram illustrating a configuration of a common cylindrical alkaline battery.

DESCRIPTION OF EMBODIMENTS

FIG. 1 illustrates a configuration of a common cylindrical alkaline battery (LR6 (AA size) alkaline battery), to which the present disclosure is applied (hereinafter referred to as an alkaline battery 1). FIG. 1 is a vertical cross-sectional view illustrating the alkaline battery 1 (cross-sectional view of the alkaline battery 1 when an extension direction of a cylinder axis is set as an up-down (vertical) direction).

As illustrated in FIG. 1, the alkaline battery 1 includes: a tubular metallic battery can closed at one end (hereinafter referred to as a positive electrode can 11); a positive electrode mixture 21 inserted into the positive electrode can 11; a cylindrical separator 22 closed at one end disposed on an inner peripheral side of the positive electrode mixture 21; a negative electrode mixture 23 filling on an inner peripheral side with respect to the separator 22; a negative electrode terminal plate 32 fitted into an opening of the positive electrode can 11 via a sealing gasket 35 made of resin; and a rod-shaped negative electrode current collector 31 made of a material such as a brass. The negative electrode current collector 31 is fixedly installed inside the negative electrode terminal plate 32 by a spot welding or a similar method. The positive electrode mixture 21, the separator 22, and the negative electrode mixture 23 constitute a power generating element 20 of the alkaline battery 1.

The positive electrode can 11 has a conductive property, and is formed, for example, by performing presswork onto a metal material such as a nickel plated steel plate. The positive electrode can 11 doubles as a positive electrode current collector and a positive electrode terminal. A protruding positive electrode terminal portion 12 is formed integrally with a bottom portion of the positive electrode can 11.

The positive electrode mixture 21 is formed as follows. Electrolytic manganese dioxide (EMD) as a positive electrode active material, graphite as a conductive material, and an electrolyte mainly containing a potassium hydroxide (KOH) are mixed together with a binder such as polyacrylic acid. Such a mixture is processed through steps of rolling, disintegration, granulation, classification, and the like, and thereafter is compressed and shaped into rings. As illustrated in FIG. 1, the positive electrode can 11 have the positive electrode mixture 21 that is configured with a plurality of (three) pellets 21a, 21b, and 21c of a tubular shape press-fitted into the positive electrode can 11 in such a manner as to be stacked in a vertical direction, with their cylinder axes being coaxial with the cylinder axis of the positive electrode can 11. The pellets 21a, 21b, and 21c axially along the positive electrode can 11 have respective lengths of d1, d2, and d3 in this order. Although the respective lengths of the pellets 21a, 21b, and 21c coincide with one another (d1=d2=d2) in this embodiment, these lengths may not coincide.

As illustrated in FIG. 1, a gap 51 is disposed between the pellet 21a and the pellet 21b and a gap 52 is disposed between the pellet 21b and the pellet 21c. The gap 51, which is disposed between the pellet 21a and the pellet 21b, has a length of s1 axially along the positive electrode can 11. The gap 52, which is disposed between the pellet 21b and the pellet 21c, has a length of s2 axially along the positive electrode can 11. A surface, of the pellet 21c, on the positive electrode terminal portion 12 side closely contacts the positive electrode can 11.

The negative electrode mixture 23 is produced by gelatinizing a zinc alloy powder as a negative electrode active material. The zinc alloy powder is produced by a gas atomization method or a centrifugal spray method. The zinc alloy powder contains: zinc; an alloy component (e.g., bismuth, aluminum, and indium) added to reduce gas (to prevent liquid leakage); and potassium hydroxide as the electrolyte. The negative electrode current collector 31 is penetrated into the center of the negative electrode mixture 23.

In order to verify the effects of improvement in discharge performance, especially heavy load discharge performance, of the alkaline battery 1 configured as described above, the following Tests 1 to 3 were conducted.

<Test 1>

In Test 1, in order to verify appropriate ranges of granularity of the zinc alloy powder in the negative electrode mixture 23 as well as the gaps 51 and 52 between the pellets constituting the positive electrode mixture 21, the granularity of the zinc alloy powder of the negative electrode mixture 23 was varied (the content percentage of the particles with a granularity of 75 μm or less (hereinafter also referred to as a "proportion of particles with 75 μm or less") was varied in a range of 20.0 to 45.0 mass %), and also the sizes of the gaps 51 and 52 were varied (the ratio of the sum of lengths of the gaps 51 and 52 axially along the positive electrode can 11, i.e., s=s1+s2, to the sum of lengths of the pellets axially along the positive electrode can 11, i.e., d=d1+d2+d3, (hereinafter also referred to as "gap/mixture height") was varied). Thus, the plurality of alkaline batteries 1 was manufactured to compare their discharge performance. All alkaline batteries 1 employed the positive electrode mixture 21 having a density (hereinafter also referred to as a "positive electrode mixture density") of 3.2 g/cm$^3$ and having a ratio of graphite to manganese dioxide in the positive electrode mixture 21 (hereinafter also referred to as a "graphite/manganese dioxide") of 10.0 mass %.

The discharge performance was compared as follows. A cycle discharge test assuming heavy load discharge, for example, during the use of a digital camera (a cycle of discharge for two seconds at 1500 mW and discharge for 28 seconds at 650 mW was performed ten times for one hour (an idle period for one hour was about 55 minutes)) was conducted. Then, the number of cycles until reaching a cutoff voltage (1.05 V) was counted for comparison.

Table 1 shows results of the discharge performance comparisons among the alkaline batteries 1. The values indicating the discharge performance in Table 1 are relative values, assuming the discharge performance of the alkaline battery 1 in Comparative Example 3 as 100.

TABLE 1

|  | Proportion of particles with 75 μm or less (Mass %) | Clearance/ mixture height (%) | Positive electrode mixture density (g/cm3) | Graphite/ manganese dioxide (Mass %) | Discharge performance |
|---|---|---|---|---|---|
| Working Example 1 | 25.0 | 5.0 | 3.2 | 10.0 | 118 |
| Working Example 2 | 30.0 | 5.0 | 3.2 | 10.0 | 125 |
| Working Example 3 | 40.0 | 5.0 | 3.2 | 10.0 | 120 |
| Comparative Example 1 | 20.0 | 5.0 | 3.2 | 10.0 | 95 |
| Comparative Example 2 | 45.0 | 5.0 | 3.2 | 10.0 | 100 |
| Working Example 4 | 30.0 | 1.0 | 3.2 | 10.0 | 120 |
| Working Example 5 | 30.0 | 8.0 | 3.2 | 10.0 | 127 |
| Working Example 6 | 30.0 | 12.0 | 3.2 | 10.0 | 120 |
| Working Example 7 | 30.0 | 14.0 | 3.2 | 10.0 | 110 |
| Comparative Example 3 | 30.0 | 0.0 | 3.2 | 10.0 | 100 |
| Comparative Example 4 | 30.0 | 0.5 | 3.2 | 10.0 | 105 |
| Comparative Example 5 | 30.0 | 15.0 | 3.2 | 10.0 | 95 |

As shown in Table 1, it has been confirmed that the alkaline batteries 1 which contain the particles with a granularity of 75 μm or less, as the zinc alloy powder of the negative electrode mixture 23, in a range of 25 to 40 mass % and which have a ratio of the sum s of the gaps 51 and 52 to the sum d of the axial lengths of the pellets (gap/mixture height) of 1 to 14%, exhibit the high discharge performance (Working Examples 1 to 7). It has been also confirmed that the alkaline batteries 1 containing the particles with a granularity of 75 μm or less, as the zinc alloy powder of the negative electrode mixture 23, in a range of 30 mass % and having a ratio of the sum s of the gaps 51 and 52 to the sum d of the axial lengths of the pellets (gap/mixture height) of 8.0% exhibit outstandingly high discharge performance (Working Example 5).

It has been found from Comparative Example 2 that the excessively large amount of fine powders of the negative electrode mixture 23 does not improve discharge performance. It is considered that this is because the electrolyte was likely to be held on the negative electrode side due to the fine powders having a small grain diameter and a large specific surface, and this reduced the electrolyte on the positive electrode side, resulting in an increase in electrical resistance on the positive electrode side.

Further, it has been found from Comparative Examples 3 and 4 that the excessively small gaps 51 and 52 do not improve discharge performance. It is considered that this is because the sufficient amount of electrolyte results in not being held on the positive electrode side due to the excessively small gaps 51 and 52.

Furthermore, it has been found from Comparative Example 5 that the excessively large gaps 51 and 52 do not improve discharge performance. It is considered that this is because the excessively large gaps 51 and 52 reduce the amount of negative electrode active material oppose to the positive electrode active material, resulting in an increase in current density.

<Test 2>

Subsequently, in order to verify an appropriate range of the density of the positive electrode mixture 21 (positive electrode mixture density), the plurality of alkaline batteries 1 including the positive electrode mixtures 21 with their densities varied (the densities of the positive electrode mixtures 21 were varied in a range of 2.8 to 3.7 g/cm$^3$) were manufactured to compare their discharge performance. It should be noted that all the alkaline batteries 1 had a ratio of the sum s of the gaps 51 and 52 to the sum d of the axial lengths of the pellets (gap/mixture height) of 5.0%. Further, all the alkaline batteries 1 employed the positive electrode mixture 21 having a ratio of graphite to manganese dioxide in the positive electrode mixture 21 (graphite/manganese dioxide) of 10.0 mass %. The discharge performance was obtained by a method similar to Test 1.

Table 2 shows the results of the discharge performance comparisons among the alkaline batteries 1. It should be noted that the values indicating the discharge performance in Table 2 are relative values, assuming the discharge performance of the alkaline battery 1 in Comparative Example 3 shown in Table 1 as 100.

TABLE 2

| | Proportion of particles with 75 μm or less (Mass %) | Clearance/ mixture height (%) | Positive electrode mixture density (g/cm3) | Graphite/ manganese dioxide (Mass %) | Discharge performance |
|---|---|---|---|---|---|
| Working Example 8 | 30.0 | 5.0 | 3.0 | 10.0 | 128 |
| Working Example 9 | 30.0 | 5.0 | 3.7 | 10.0 | 123 |
| Comparative Example 6 | 30.0 | 5.0 | 3.9 | 10.0 | Mixture cannot be manufactured. |
| Comparative Example 7 | 30.0 | 5.0 | 2.8 | 10.0 | 86 |

As shown in Table 2, it has been confirmed that the discharge performance of the alkaline batteries 1 is enhanced with the density of the positive electrode mixture 21 (positive electrode mixture density) in a range of 3.0 to 3.7 g/cm$^3$ (Working Examples 8 and 9). It has been also confirmed that the discharge performance is outstandingly enhanced with the density of the positive electrode mixture 21 of 3.0 g/cm$^3$ (Working Example 8).

The excessively high density of the positive electrode mixture 21 was likely to cause cracking, resulting in difficulty in compression molding, thereby failing to manufacture the pellets (Comparative Example 6).

The excessively low density of the positive electrode mixture 21 failed to obtain the sufficient discharge performance (Comparative Example 7). It is considered that this is because the excessively low density of the positive electrode mixture 21 causes insufficient conductivity inside the positive electrode mixture 21.

<Test 3>

Subsequently, in order to verify an appropriate range of the ratio of graphite to manganese dioxide in the positive electrode mixture 21 (graphite/manganese dioxide), the plurality of alkaline batteries 1 with their ratios varied (the ratios were varied in a range of 2.0 to 25.0 mass %) were manufactured to compare their discharge performance. The discharge performance was obtained by the method similar to the above-described method. All the alkaline batteries 1 had a ratio of the sum s of the gaps 51 and 52 to the sum d of the axial lengths of the pellets (gap/mixture height) of 5.0%. Further, all the alkaline batteries 1 employed the density of the positive electrode mixture 21 (positive electrode mixture density) of 3.2 g/cm$^3$.

Table 3 shows the results of the discharge performance comparisons among the respective alkaline batteries 1. It should be noted that the values indicating the discharge performance in Table 3 are relative values, assuming the discharge performance of the alkaline battery 1 in Comparative Example 3 shown in Table 1 as 100.

TABLE 3

| | Proportion of particles with 75 μm or less (Mass %) | Clearance/ mixture height (%) | Positive electrode mixture density (g/cm3) | Graphite/ manganese dioxide (Mass %) | Discharge performance |
|---|---|---|---|---|---|
| Working Example 10 | 30.0 | 5.0 | 3.2 | 5.0 | 126 |
| Working Example 11 | 30.0 | 5.0 | 3.2 | 15.0 | 132 |
| Working Example 12 | 30.0 | 5.0 | 3.2 | 20.0 | 119 |
| Comparative Example 8 | 30.0 | 5.0 | 3.2 | 2.0 | 77 |
| Comparative Example 9 | 30.0 | 5.0 | 3.2 | 25.0 | 85 |

As shown in Table 3, it has been confirmed that the discharge performance is enhanced with the ratio of graphite to manganese dioxide in the positive electrode mixture 21 (graphite/manganese dioxide) in a range of 5 to 20 mass % (Working Examples 10 to 12). It has been also confirmed that the discharge performance is outstandingly enhanced with the ratio of graphite to manganese dioxide in the positive electrode mixture 21 (graphite/manganese dioxide) of 15.0 mass % (Working Example 11).

The excessively small ratio of the graphite failed to obtain sufficient discharge performance (Comparative Example 8). It is considered that this is caused by insufficient conductivity inside the positive electrode mixture 21.

The excessively large ratio of the graphite failed to obtain sufficient discharge performance (Comparative Example 9). It is considered that this is because the amount of electrolyte was reduced in the positive electrode mixture 21 due to an influence from the water-repellent graphite.

Effects

As described above, the following has been found. The discharge performance of the alkaline battery 1 is enhanced in the case where the negative electrode mixture 23 contains, as the zinc alloy powder, particles with a granularity of 75 µm or less in a range of 25 to 40 mass % and the ratio of the sum s of the gaps 51 and 52 to the sum d of the axial lengths of the pellets are set to 1 to 14%. The satisfactory results are obtained especially in the case where the negative electrode mixture 23 containing, as the zinc alloy powder, particles with a granularity of 75 µm or less in the range of 30 mass % is employed and the ratio of the sum s to the gaps 51 and 52 to the sum d of the axial lengths of the pellets is set to 8.0%.

It has been confirmed that the discharge performance is enhanced in the case where the positive electrode mixture 21 has a density in a range of 3.0 to 3.7 g/cm$^3$. It has been found that the satisfactory results are obtained especially in the case where the positive electrode mixture 21 has a density of 3.0 g/cm$^3$.

It has been confirmed that the discharge performance is enhanced in the case where the ratio of graphite to manganese dioxide in the positive electrode mixture 21 (graphite/manganese dioxide) is in a range of 5 to 20 mass %. It has been found that the satisfactory results are obtained especially in the case where the ratio of graphite to manganese dioxide in the positive electrode mixture 21 (graphite/manganese dioxide) is 15.0 mass %.

The description of the above-described embodiment is for ease of understanding of the present disclosure and does not limit the present disclosure. The present disclosure may be modified or improved without departing from the gist and includes the equivalents.

For example, the above-described embodiment configures the number of pellets constituting the positive electrode mixture 21 to be three. However, the number of pellets may be two or four or more. In short, it is only necessary that the ratio of the sum s of the lengths of the gap (s) between the pellets axially along the positive electrode can 11 to the sum d of the lengths of the pellets axially along the positive electrode can 11 meets the above-described conditions, together with other necessary conditions. This ensures the above-described effects.

REFERENCE SIGNS LIST

1 alkaline battery
11 positive electrode can
12 positive electrode terminal portion
20 power generating element
21 positive electrode mixture
21a, 21b, 21c pellet
22 separator
23 negative electrode mixture
31 negative electrode current collector
32 negative electrode terminal plate
35 sealing gasket
51, 52 gap

The invention claimed is:

1. A method of making an alkaline battery comprising:
press-fitting a plurality of positive electrode pellets inside of an open end of a positive electrode can, the positive electrode can being cylindrical in shape and closed at an end opposite to the open end,
the positive electrode pellets being tubular in shape, the press-fitting being performed in such a manner as to insert a first pellet of the positive electrode pellets into the positive electrode can to closely contact a bottom portion of the positive electrode can, and then stack remaining pellets of the positive electrode pellets coaxially with the first pellet, inside of and in contact with the positive electrode can, with gaps between adjacent positive electrode pellets, the tubular positive electrode pellets extending only a fixed, predetermined distance towards an axis of the positive electrode can, the gaps and the positive electrode pellets having a ratio of a sum s of length of the gaps between the positive electrode pellets axially along the positive electrode can to a sum d of lengths of the positive electrode pellets axially along the positive electrode can, the ratio being 1 to 14%,
the press-fitting being followed by disposing a separator inside of cylindrical inner side surfaces of the tubular pellets, followed by
filling an inner peripheral side of the separator with a negative electrode mixture, followed by
inserting a negative electrode current collector into the negative electrode mixture; followed by
sealing the open end of the positive electrode can with a negative electrode terminal plate,
wherein the negative electrode mixture contains a powder mainly containing zinc, the powder containing particles with a granularity of 75 µm or less in a range of 25 to 40 mass %,
wherein further the positive electrode pellets contain manganese dioxide and a conductive material, the positive electrode pellets having a density in a range of 3.0 to 3.7 g/cm$^3$, and containing graphite as the conductive material in a range of 5 to 20 mass % with respect to the manganese dioxide.

2. The method of claim 1 wherein the positive electrode can is formed by performing presswork onto a metal material.

3. The method if claim 2 wherein a protruding positive electrode terminal portion is formed integrally with a bottom portion of the positive electrode can.

4. The method of claim 1 wherein a non-conductive sealing gasket is placed between the positive electrode can and the negative electrode terminal plate.

* * * * *